United States Patent Office 3,560,578
Patented Feb. 2, 1971

3,560,578
REACTION FOR LINKING NUCLEI OF
ADAMANTANE HYDROCARBONS
Abraham Schneider, Overbrook Hills, Pa., assignor to
Sun Oil Company, Philadelphia, Pa., a corporation of
New Jersey
No Drawing. Continuation-in-part of application Ser. No.
725,888, May 1, 1968, which is a continuation-in-part
of application Ser. No. 649,810, June 29, 1967. This
application May 8, 1969, Ser. No. 823,138
Int. Cl. C07c 17/00, 23/18
U.S. Cl. 260—648                                23 Claims

ABSTRACT OF THE DISCLOSURE

New products having adamantane nuclei linked through either a $C_3$ or $C_4$ polymethylene linkage are prepared by reacting adamantane or alkyladamantanes with a $C_3$–$C_4$ alkyl chloride or bromide at —20° C. to 50° C. using $AlCl_3$ or $AlBr_3$ as catalyst. Preferably primary or secondary $C_3$–$C_4$ alkyl halides are used as the reactant. Reaction conditions are such that the catalyst is maintained in solution in the reaction mixture. Bis-type products containing two linked adamantane nuclei and 0–2 halogen atoms substituted at bridgehead positions can be obtained, as well as polymers which can be linear or cross-linked. The products have various utilities, such as in compositions for coating, investment casting, caulking and potting, in adhesive compositions, as chromatographic separation media, and as thermostatic actuating elements.

CROSS REFERENCES TO RELATED APPLICATIONS

This application is a continuation-in-part of copending application Ser. No. 725,888, filed May 1, 1968, which in turn was a continuation-in-part of application Ser. No. 649,810, filed June 29, 1967, and now abandoned, both of these parent applications being copending with and disclosing subject matter in common with my application Ser. No. 613,443, filed Feb. 2, 1967, which issued on May 7, 1968 as Pat. No. 3,382,288.

BACKGROUND OF THE INVENTION

This invention relates to a method for reacting adamantane hydrocarbons with either $C_3$ or $C_4$ alkyl halides so as to cause linking of adamantane nuclei through a $C_3$ or $C_4$ polymethylene bridge, thus yielding novel products having two or more adamantane nuclei per molecule. The starting adamantane hydrocarbons are of the $C_{10}$–$C_{20}$ range and include adamantane itself and alkyladamantanes having at least one unsubstituted bridgehead carbon atom and no alkyl tertiary carbon atom.

The cage-like structure of the adamantane nucleus has been illustrated in several ways, of which the following is one example:

As can be seen, it consists of three condensed cyclohexane rings arranged so that there are four bridgehead carbon atoms which are equivalent to each other.

The preparation of methyl- and/or ethyl-substituted adamantanes by the isomerization of tricyclic naphthenes by means of an aluminum halide or HF–$BF_3$ catalyst has been described in several references including the following: Schneider U.S. Pat. No. 3,128,316; Janoski et al. U.S. Pat. No. 3,275,700; Schleyer et al., Tetrahedron Letters No. 9, pp. 305–309 (1961); and Schneider et al., JACS, vol. 86, pp. 5365–5367 (1964). The isomerization products can have the methyl and/or ethyl groups attached to the adamantane nucleus at either bridgehead or non-bridgehead positions or both, although completion of the isomerization reaction favors bridgehead substitution. Examples of alkyladamantanes made by such isomerization are methyladamantanes, dimethyladamantanes, ethyladamantanes, methylethyladamantanes, dimethylethyladamantanes, trimethyladamantanes and tetramethyladamantanes.

Preparation of adamantane hydrocarbons having higher alkyl groups has been disclosed by Spengler et al., Erdöl und Kohle-Erdgas-Petrochemie, vol. 15, pp. 702–707 (1962). These authors used a Wurtz synthesis involving the reaction of 1-bromoadamantane with alkali metal alkyls to interchange the alkyl group for the bromine substituent. In this manner 1-n-butyladamantane and 1-n-hexyladamantane were prepared.

Recently Hoek et al., 85 (1966) Recueil 1045–1053, have described a different route for the preparation of butyl-substituted adamantane. The procedure involved reacting either 1-bromoadamantane or 2-bromoadamantane with thiophene using $SnCl_4$ as catalyst in the presence of excess thiophene as solvent to produce adamantylthiophenes and then hydrogenating the adamantylthiophenes to yield butyl-substituted adamantanes.

Also in the prior art, Gerzon et al., J. Med. Chem., 6, 760–763 (1963), and Gerzon U.S. Pat. No. 3,096,372 disclose the reaction of adamantane, dissolved in a relatively large proportion of cyclohexane, with t-butyl chloride promoted by means of $AlCl_3$. Under the conditions therein utilized, the main reaction was a hydrogen-chlorine interchange between the two reactants yielding 1-chloroadamantane. While there is some degree of similarity between the materials used in this reaction and those employed in the present process, essential differences in conditions and reactants are maintained, as hereinafter explained, so that the reaction proceeds in a different manner such as to cause linking of adamantane nuclei.

SUMMARY OF THE INVENTION

The present invention provides a method for converting adamantane hydrocarbons into novel products having two or more adamantane nuclei per molecule joined to each other through either a $C_3$ or $C_4$ polymethylene linkage. Products containing only two adamantane nuclei so linked can be prepared and are either 1,3-disubstituted propanes or 1,4-disubstituted butanes, with the substituents corresponding to the starting adamantane hydrocarbon or to such hydrocarbon but having one or two halogen atoms thereto at bridgehead positions. The invention also provides novel polymer products which contain more than two adamantane nuclei linked through $C_3$ or $C_4$ polymethylene bridges. These include both linear polymers and cross-linked polymers. The process for making these products involves reacting the starting adamantane hydrocarbon with a $C_3$ or $C_4$ alkyl chloride or bromide in the presence of $AlCl_3$ or $AlBr_3$ under conditions such that the reaction mixture is homogeneous, the $AlCl_3$ or $AlBr_3$ upon addition becoming dissolved in the mixture of reactants and being kept at least mainly in solution therein during the reaction. The procedure can be regulated to maximize production of the disubstituted propane or butane product containing two adamantane nuclei or to yield mainly polymeric product having a greater number of adamantane nuclei per molecule.

DESCRIPTION OF THE INVENTION

For purpose of convenience, the products which contain only two adamantane nuclei are referred to herein as the "bis-type" products, while the higher molecular weight products containing more than two adamantane nuclei are referred to herein as "polymer."

The bis-type products include compounds containing no halogen atom and halo derivatives thereof which have either one or two halogen atoms. These products conform to the formula

wherein A represents the combination of an adamantane nucleus with 0;3 alkyl substituents, X is a bridgehead substituent of the group consisting of chlorine, bromine, hydrogen and alkyl having no tertiary carbon atom and $n$ is 3 or 4. The total number of carbon atoms in each —A—X moiety is in the range of 10–20. When the starting adamantane hydrocarbon has two or more unsubstituted bridgehead positions, in many cases the major portion of the bis-type product obtained from the process is the dihalo product wherein each "X" substituent in the above formula is chlorine or bromine. For example, in reacting n-butyl chloride with 1-ethyladamantane under conditions given mainly bis-type product, the main component thereof generally will be the following compound:

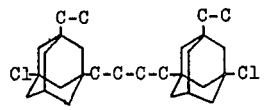

Usually the bis-type product will also include a substantial amount of the corresponding monochloro product as well as the corresponding hydrocarbon. Likewise homologous bis-type compounds having trimethylene instead of tetramethylene linkages will be produced when n-propyl chloride is used in place of n-butyl chloride.

Polymer products that can be made in accordance with the invention include both linear-type polymers and cross-linked polymers, depending largely upon the number of unsubstituted bridgehead positions in the starting adamantane hydrocarbon. For example, when the starting hydrocarbon is 1,3-dimethyladamantane, only the linear type of polymer can be obtained, such polymer having the following linkage when a $C_3$ alkyl halide is used in the reaction:

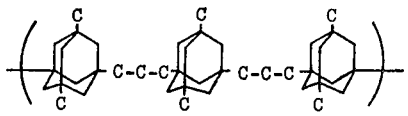

When 1-ethyl-3-methyladamantane is used, an analogous polymer can be obtained having an ethyl group in place of one methyl group on each nucleus. For obtaining such linear polymers, the starting adamantane hydrocarbon must have two and only two unsubstituted bridgehead carbon atoms in the nucleus. On the other hand, when the starting hydrocarbon has 3 or 4 unsubstituted bridgehead positions, cross-linking between chains may occur via trimethylene or tetramethylene linkages between adamantane nuclei in each chain, resulting in the cross-linked type of polymer. Examples of adamantane hydrocarbons from which the cross-linked polymer can be prepared are: adamantane; 1-ethyladamantane; 2-methyladamantane; 1-ethyl-2-methyladamantane; 1-ethyl-4-methyladamantane; any of the dimethyladamantane isomers or the trimethyladamantane isomers or the ethyldimethyladamantane isomers in which not more than one of the alkyl groups is positioned at a bridgehead position; n-hexyladamantanes; n-decyladamantanes; and the like.

Both the bis-type and polymer products are made by generally the same reaction procedure, and the type obtained as the main product of the reaction depends upon the starting adamantane hydrocarbon used, its proportion to the alkyl halide reactant, whether the alkyl halide is primary, secondary or tertiary, and the temperature at which the reaction is conducted.

In accordance with the invention, adamantane nuclei are linked through a $C_3$ or $C_4$ polymethylene linkage to give either bis-type products or polymers or both by a procedure comprising:

(a) forming a solution of (1) a $C_{10}$–$C_{20}$ adamantane hydrocarbon which is adamantane or an alkyladamantane having at least one unsubstituted bridgehead carbon atom and no alkyl tertiary carbon atom and (2) a $C_3$–$C_4$ alkyl chloride or bromide in molar ratio relative to said hydrocarbon in excess of 1:1 but less than 2:1 when the alkyl halide is tertiary butyl halide, said alkyl halide being a primary or secondary alkyl halide when said hydrocarbon is adamantane;

(b) maintaining said solution at a temperature in the range of —20° C. to 50° C. while admixing therewith and dissolving therein $AlCl_3$ or $AlBr_3$ until at least a major portion of said adamantane hydrocarbon has reacted, said temperature being above 10° C. when said alkyl halide is tertiary butyl halide; and (c) recovering from the reaction mixture a product having adamantane nuclei linked between bridgehead positions through a $C_3$–$C_4$ polymethylene linkage.

As a specific illustration of the process, 100 moles of 1,3-dimethyladamantane are dissolved in 150 moles of t-butyl chloride. While the mixture is being stirred at room temperature, $AlCl_3$ in small lots (e.g., 0.5 mole each) is added over the course of two hours until a total of 5 moles has been added. The $AlCl_3$ goes into solution, gaseous HCl and isobutane evolve, and no separate catalyst complex phase is formed. After the reaction has proceeded sufficiently, the reaction mixture sets up to a stiff paste. The main reaction which takes place can be represented by the following equation (hydrogen atoms being omitted):

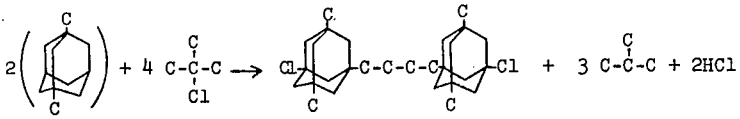

Thus, under these conditions (molar ratio of t-butyl chloride to adamantane hydrocarbon=1.5:1 and temperature=about 25° C.) the product is comprised of a substantial amount of bis-type material. The major component of this bis-type material is, as shown by the equation, 1,4-bis(3-chloro-5,7-dimethyl-1-adamantyl)butane, which, after purification, melts at 215–217° C. Also obtained as reaction products but in lesser amounts are the corresponding bis-type products containing, respectively, one chlorine atom and no chlorine as depicted in the following formulas:

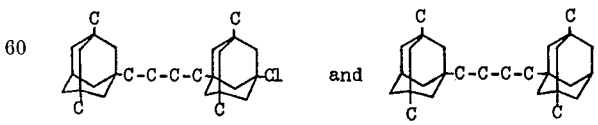

Chromatographic analysis of the reaction product reveals these three bis-type products as three separate peaks, with the dichloro product being the major component. It is noteworthy here that while the reactant (t-butyl chloride) which supplies the linkage moiety of the product is branched, the linkage surprisingly is unbranched. If n-butyl, isobutyl or sec-butyl chloride or bromide is substituted for the t-butyl halide, the same 1,4-disubstituted butanes are obtained. When 1-ethyl-3-methyladamantane is used in the foregoing reaction in place of 1,3-dimethyladamantane, the main product is 1,4-bis(3-halo-5-ethyl-7-methyl-1-adamantyl)butane.

Analogously, when either n-propyl or isopropyl halides are reacted with 1,3-dimethyladamantane under conditions as given in the above illustration, bis-type products which are 1,3-disubstituted propanes and otherwise the same as the foregoing products are obtained. Usually, the major component is the dihalo bis-type product, viz 1,3-bis(3-halo-5,7-dimethyl - 1 - adamantyl)propane. Similarly, the use of 1-ethyl-3-methyladamantane in place of 1,3-dimethyladamantane usually gives 1,3-bis(3-halo-5-ethyl-7-methyl-1-adamantyl)propane as the main product.

While the specific illustration given above shows the use of a tertiary halide, it is distinctly preferable in practicing the invention to employ primary or secondary alkyl halides. Tertiary butyl chloride or bromide will yield bis-type products only when certain conditions are established and otherwise tend to effect bridgehead halogenation of the adamantane nucleus, as described in my copending application U.S. Ser. No. 702,789, filed Feb. 5, 1968, now Pat. No. 3,485,880, issued Dec. 23, 1969, rather than to cause linking of the adamantane nuclei. In order to secure such linking reaction via tertiary butyl chloride or bromide, it is essential that (1) temperature be in the range of 10–50° C., preferably 20–40° C., and (2) that the molar ratio of the tertiary butyl halide to the adamantane hydrocarbon be less than 2:1 but above 1:1. It is also essential that the adamantane hydrocarbon be an alkyladamantane rather than adamantane itself, since linkage of the latter can be effected only when a primary or secondary alkyl halide is used.

When the starting hydrocarbon has two or more unsubstituted bridgehead positions and the alkyl halide is a primary or secondary chloride or bromide, production of bis-type product in preference to polymer can be accomplished by using a molar ratio of alkyl halide to starting hydrocarbon in the range of 1:1 to 3:1. On the other hand, formation of polymer can be favored by increasing such ratio to well above 3:1, e.g., to 6–20:1.

When the starting hydrocarbon has only one open bridgehead position, only the bis-type product containing no halogen can be obtained. Thus, for example, the reaction of 1-ethyl-3,5-dimethyladamantane with iso- or n-propyl chloride or bromide under conditions of the present process gives only the following as product:

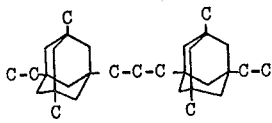

As another example, when a tetramethyladamantane is used which has only one of its methyl substituents at a non-bridgehead position, e.g., 1,3,5,6-tetramethyladamantane, the product will be an isomer of the hydrocarbon shown above but will have one bridgehead and one non-bridgehead methyl group in place of each ethyl group. These hydrocarbons and other bis-type products which can be produced by the present process generally are high melting solids.

An important feature of the process for the preparation of either bis-type products or polymers is that a homogeneous system is established and maintained for the reaction, without any substantial amount of separate catalyst phase being formed. The AlCl$_3$ or AlBr$_3$, upon addition to the mixture of reactants, probably reacts with the alkyl halide and forms a complex which may at least in part serve as the active catalyst species. However, it is considered more probable that dissolved AlCl$_3$ or AlBr$_3$ is the catalytic agent and that, at least in the case of AlCl$_3$, the complex formed is necessary for bringing the AlCl$_3$ into solution. In any event, in order to establish and keep the condition of homogeneity which is highly desirable for practicing this invention, it is necessary that the alkyl halide content of the mixture be sufficiently high so that the complex will be maintained in solution and not form a separate phase. If conditions are such that the aluminum halide does not dissolve in the reaction mixture or that the catalyst complex mainly precipitates from the mixture, the catalyst then promotes mainly a hydrogen-halogen interchange reaction rather than the desired linking reaction that gives the bis-type or polymer products. For example, if a large proportion of saturated hydrocarbon diluent, e.g., cyclohexane, is used, the catalyst complex will be substantially insoluble in the mixture and thus will form a separate phase. This will cause the hydrogen-halogen interchange reaction to occur in preference to the linking reaction. This is one reason why the prior art reaction, referred to above, of adamantane with t-butyl chloride in the presence of cyclohexane gave 1-chloroadamantane rather than linked product.

Still another reason why this prior art reaction gave 1-chloroadamantane instead of the kind of products obtained by the present process is due to the use of a tertiary butyl halide with adamantane as the starting hydrocarbon. Either t-butyl chloride or t-butyl bromide tend to favor the hydrogen-halogen interchange reaction much more so than do the primary or secondary C$_3$–C$_4$ halides, and particularly so when the starting hydrocarbon is adamantane itself. Consequently, when adamantane is employed, only a primary or secondary halide should be employed, viz n-propyl, isopropyl, n-butyl, isobutyl or sec-butyl chloride or bromide. For any of the alkyladamantanes it is permissible also to use t-butyl halide to effect the linking reaction provided that its molar ratio to the alkyladamantane is in the range of 1:1 to 2:1 and the temperature is above 10° C., as pointed out above. However, it is distinctly preferable to carry out the reaction using either a primary or secondary halide.

It will be noted from the equation presented above that when t-butyl halide is used the linkage between the adamantane nuclei unexpectedly has no methyl branch and only 1,4-disubstituted butanes are obtained. In other words, the normal, secondary and tertiary butyl chlorides or bromides all give a tetramethylene linkage between the adamantane nuclei.

The process of the present invention is limited to the use of alkyl chlorides or bromides of the C$_3$–C$_4$ range. The desired products are not obtained when ethyl chloride or bromide is employed, nor does the reaction proceed as desired when C$_5$ or higher alkyl halides are used. The ethyl halides are substantially inert at the conditions employed in this process. On the other hand, the C$_5$ and higher halides tend to form insoluble catalyst sludge rather than the desired active complex which remains in solution and catalyzes reaction in the desired fashion.

Reaction temperatures for the process fall in the range of −20° C. to 50° C. and, when a primary or secondary alkyl halide is employed, preferably are in the range of 0° to 30° C. For making polymers a temperature above 15° C. generally should be used and preferably a temperature in the range of 20–30° C. is employed. Only a relatively small proportion of AlCl$_3$ or AlBr$_3$ is needed for effecting the reaction, and it is generally desirable that the total molar proportion thereof relative to the alkyl halide be less than 0.2 and preferably in the range of 0.001 to 0.1, more preferably 0.005–0.1. The aluminum halide desirably is added in small increments throughout the reaction period while vigorously stirring the mixture. During the reaction HCl and either propane or isobutane are released and may be vented from the system as the reaction proceeds. Generally the reaction is complete within an hour after mixing the reactants and catalyst.

After completion of the reaction, methanol can be stirred into the reaction mixture to kill the catalyst and the mixture can then be worked up in any suitable manner to obtain the products. When the products are of the bis-type, the monohalo and the hydrocarbon products can be separated from the dihalo product and from each other by fractional crystallization using a suitable solvent such as carbon tetrachloride or methylene dichloride and, if desired, can be recycled for further reaction to increase the yield of dihalo product. Polymer products, if not too highly cross-linked, can be dissolved in a solvent such as benzene and fractions of various molecular weights can be separated from the solution by addition of a suitable antisolvent, such as acetone, in controlled amounts to cause selective precipitation.

The following examples are specific illustrations of the invention. In most of the examples the feed hydrocarbon was 1,3-dimethyladamantane which, for convenience, is referred to as "DMA." The bis-type products obtained therefrom have 0, 1 or 2 chlorine atoms per molecule and were identified and designated as follows for examples in which $C_4$ alkyl chlorides were used:

| | | |
|---|---|---|
| (I) | H—(DMA)—(CH₂)₄—(DMA)—H | 1,4-bis(3,5-dimethyl-1-adamantyl)butane. |
| (II) | Cl—(DMA)—(CH₂)₄—(DMA)—H | 1-(3-chloro-5,7-dimethyl-1-adamantyl)-4-(3,5-dimethyl-1-adamantyl)butane. |
| (III) | Cl—(DMA)—(CH₂)₄—(DMA)—Cl | 1,4-bis(3-chloro-5,7-dimethyl-1-adamantyl)butane. |

Identities of these products were established by VPC analysis, IR, NMR and mass spectra. Analyses of the reaction products in the examples which follow are given on an alkyl chloride reactant-free basis.

EXAMPLE 1

This example illustrates the reaction of DMA with n-butyl chloride under conditions yielding mainly bis-type products. A blend of 2.25 g. (0.0243 mole) of n-butyl chloride and 2.00 g. (0.0122 mole) of DMA (molar ratio=2.0) was stirred at 28° C. and 0.1 g. of AlCl₃ was added. The AlCl₃ dissolved giving a homogeneous, yellow-green solution and a steady evolution of gas occurred. In 7 minutes the solution became hazy, at 12 minutes viscous and opaque, and at 17 minutes stiff with precipitate. In 38 minutes the mixture could no longer be stirred. At 60 minutes the mixture was triturated with 1 ml. of methanol, resulting in a plastic mass. Heating with 4 ml. of toluene caused complete dissolution, and cooling of the solution to room temperature effected extensive crystallization. A VPC analysis of the entire reaction product gave results shown in Table A, the results being given in weight percent on a butyl chloride-free basis.

TABLE A

| | Example 1 (n-butyl Cl, 28° C.) | Example 2 (n-butyl Cl, 0° C.) |
|---|---|---|
| DMA, percent | 4.3 | 0.4 |
| 1-chloro-DMA | 15.4 | 8.2 |
| Unknown A | 1.1 | 1.0 |
| 1,3-dichloro-DMA | 5.6 | 7.0 |
| Chlorobutyl-DMA's, several peaks | 8.8 | 9.0 |
| Chlorobutyl-DMA chlorides | 0.4 | None |
| Unknown B | 0.2 | 2.9 |
| Unknown C | 2.2 | |
| bis Compound I | 0.9 | None |
| bis Compound II | 15.4 | 6.2 |
| bis Compound III | 45.9 | 65.3 |
| Polymer | None | None |

The results in Table A for Example 1 show that the bis-type material constituted most of the reaction product and that the main component thereof was the dichloro bis-type derivative designated III, viz 1,4-bis(3-chloro-5,7-dimethyl-1-adamantyl)butane.

EXAMPLE 2

The reaction mixture was essentially the same as in the preceding example except that 0.2 g. of AlCl₃ was used, but in this case the reaction temperature was 0° C. The reaction began slowly and seemed to accelerate as the AlCl₃ slowly dissolved. No separate catalyst complex phase was formed. Within 47 minutes the mixture had set up solid. After standing overnight at 0° C., the mixture was worked up by triturating the solid with methanol and filtering. The resulting solid melted throughout the range of 135–200° C. and was easily soluble in toluene even at 0° C. Results of VPC analysis of this product also are given in Table A, from which it can be seen that the bis-dichloro product is obtained in still better yield by using the lower reaction temperature.

EXAMPLE 3

This run was made using sec-butyl chloride (2.26 g.), DMA (2.00 g.) and 0.1 g. of AlCl₃ with a reaction temperature of 0° C. The molar ratio of alkyl chloride to DMA again was 2.0. The AlCl₃ dissolved rapidly giving a greenish, homogeneous solution and copious evolution of gas. In about 15 minutes the mixture had set up solid. After standing two days at room temperature, the mixture was mixed with methanol and filtered, and the residue was dissolved in toluene and analyzed by VPC analysis. Results are shown in Table B.

EXAMPLE 4

The alkyl chloride used in t-butyl chloride and its reaction with DMA was carried out at about 26° C. and at a molar ratio of alkyl chloride to DMA of 1.4. Specifically, 100 g. (0.609 mole) of DMA and 80.4 g. (0.869 mole) of t-butyl chloride at ambient temperature and pressure were mixed with 0.5 g. of AlCl₃. The AlCl₃ dissolved, an immediate evolution of gas took place and the solution turned yellow. At intervals during a time of one hour additional 0.5 g. increments of AlCl₃ were added until a total of 2.5 g. of AlCl₃ had been used. At this point extensive crystallization of product had occurred. Finally 2.5 g. of additional AlCl₃ (0.0375 mole total) were added and the thick mixture was stirred for another hour. All of the AlCl₃ went into solution and no separate catalyst complex phase was formed during the reaction. The product was worked up by adding 200 ml. of water and heating and stirring the mixture on a steam bath. The resulting organic phase was a slightly yellow, molasses-like liquid. A small sample of it was dissolved in toluene and analyzed, giving results also shown in Table B. The remainder was admixed with 200 ml. of methylene chloride and most but not all of it dissolved. After washing the solution with 10% aqueous sodium hydroxide, reaction product was crystallized by boiling off most of the solvent and filtering to give about 48 g. of high-melting solid. This material was recrystallized three times from CCl₄ to give white, salt-like crystalline product, M.P. 215–217° C. This product was substantially pure dichloro bis-type product III, listed above.

TABLE B

| | Example 3 (sec-butyl Cl, 26° C.) | Example 4 (t-butyl Cl, 26° C.) |
|---|---|---|
| DMA, percent | 1.3 | 18.5 |
| 1-chloro-DMA | 11.0 | 39.4 |
| Unknown A | 1.0 | 2.7 |
| 1,3-dichloro-DMA | 6.3 | 3.4 |
| Chlorobutyl-DMA's (several peaks) | 10.4 | 1.1 |
| Chlorobutyl-DMA chlorides | | None |
| Unknown B | None | 0.2 |
| Unknown C | 0.5 | 1.0 |
| bis Compound I | 3.2 | 3.9 |
| bis Compound II | 42.0 | 8.7 |
| bis Compound III | 24.4 | 21.1 |
| Polymer | None | None |

The results given for Example 3 show that sec-butyl chloride also gave bis-type products as the main reaction product, but in this case the monochloro bis compound II predominated although a considerable amount of the dichloro bis compound III was also obtained. A comparison of Example 4 with the other examples shows that tertiary butyl chloride gives a substantially lower yield of bis compounds than does secondary or normal butyl chloride and has considerably greater tendency merely to give bridgehead chlorination product of the adamantane hydrocarbon feed. Accordingly tertiary butyl chloride is the least preferred alkyl chloride for purposes of this invention.

It should also be noted from the foregoing examples that all the bis-type products (I, II and III) have unbranched (tetramethylene) linkages between the adamantane nuclei regardless of whether a primary, secondary or tertiary alkyl halide is used in the reaction.

EXAMPLE 5

In this example an investigation to indicate the course of reaction between sec-butyl chloride and DMA (molar ratio=5.2) was made by reacting the same at 0° C. and lower and taking small samples for analysis at reaction times of about 2, 6 and 18 minutes. Specifically, a blend of 0.901 g. (0.00548 mole) of DMA and 2.61 g. (0.0282 mole) of sec-butyl chloride in a reaction vial was cooled to −80° C. in a low temperature bath and 0.2 g. (0.0015 mole) of AlCl$_3$ was mixed with the blend. No reaction occurred. The vial was then placed in another bath at 0° C. while the mixture was being stirred, whereupon the latter turned pale green and began evolving HCl. After 2 minutes the vial was cooled quickly in the low temperature bath and a small sample was taken for analysis. It was again transferred to the second bath for an additional 4 minutes (6 minutes total) and another sample was taken in the same manner. The procedure was repeated again and a third sample was taken after a total reaction time of about 18 minutes in the second bath. Analyses of the three samples are given in Table C.

TABLE C
[Reaction of sec-butyl chloride and DMA at 0° C.]

|  | Time of sampling, min. | | |
| --- | --- | --- | --- |
|  | 2 | 6 | 18 |
| DMA, percent | 0.4 | 0.4 | 0.1 |
| 1-chloro-DMA | 23.1 | 16.8 | 12.3 |
| Unknown A | 1.8 | 1.5 | 1.0 |
| 1,3-dichloro-DMA | 10.7 | 8.9 | 6.7 |
| Chlorobutyl-DMA's several peaks | 27.0 | 31.5 | 29.1 |
| Chlorobutyl-DMA chlorides, several peaks | 10.7 | 13.3 | 12.7 |
| Unknown B | 0.2 | Trace | None |
| Unknown C | 1.1 | 0.6 | 0.5 |
| bis Compound I | 9.0 | 13.0 | 21.3 |
| bis Compound II | 4.0 | 9.8 | 11.8 |
| bis Compound III | 2.0 | 4.3 | 4.5 |
| Polymer | None | None | None |

The data in Table C provide clues as to the mechanism by which coupling of the adamantane nuclei through polyalkylene linkages occurs. The first step in the reaction chain appears to be a hydrogen-halogen interchange between the DMA and alkyl chloride by a carbonium ion mechanism to give 1-chloro-DMA, which then reacts with the alkyl chloride to form a number of chlorobutyl-DMA's. The data at two minutes reaction time show a 27% content of these chlorobutyl-DMA isomers in the reaction product. Some of these apparently undergo a hydrogen-halogen interchange reaction to form chlorobutyl-DMA chlorides which in Table C reached a maximum value (13.3%) at about 6 minutes. It appears that the bis-type compounds are formed by reaction of these various chlorobutyl-substituted intermediates with 1-chloro-DMA by further carbonium ion mechanisms. Table C shows that at the end of 18 minutes reaction time the three bis-type compounds constituted about 37.6% by weight of the reaction product and that the bis-type hydrocarbon (I) was the main one of these products under the conditions of this run. Further reaction would have increased the yield of the bis-type products and of the relative proportions of the halogenated bis compounds.

Although in Example 5 a relatively high molar ratio (5.2) of alkyl chloride to DMA was used, nevertheless no polymer was obtained. This was due to the low reaction temperature and indicates that a temperature well above 0° C. (e.g. >15° C.) should be used if polymer is desired as product.

EXAMPLE 6

This example was carried out using a deficiency of n-butyl chloride such that a separate phase of catalyst complex was formed, for the purpose of illustrating the adverse effect of using an insufficient amount of the alkyl halide. The molar ratio of n-butyl chloride to DMA was 0.28. Specifically, to a blend of 2.0 g. (0.0122 mole) of DMA and 0.32 g. (0.00346 mole) of n-butyl chloride was added 0.05 g. of AlCl$_3$ and the mixture was stirred at 28° C. A slow evolution of HCl occurred, the AlCl$_3$ dissolved, and in a few minutes a yellow complex layer precipitated. After stirring for one hour the mixture was hydrolyzed with water, dried and then analyzed. Results are shown in Table D.

TABLE D

Reaction of DMA with deficiency of n-butyl chloride

|  | Example 6, percent |
| --- | --- |
| DMA | 63.0 |
| 1-chloro-DMA | 30.0 |
| Unknown A | 1.3 |
| 1,3-dichloro-DMA | 2.6 |
| Chloroalkyl-DMA's | 0.4 |
| Unknowns: | |
| B | 0.2 |
| C | 0.3 |
| Bis compounds: | |
| I | 1.8 |
| II | 0.5 |
| III | None |

The data in Table D show that the reaction did not proceed substantially beyond the hydrogen-halogen interchange forming 1-chloro-DMA and that significant amounts of the bis compounds were not obtained. This illustrates the need for carrying out the reaction with an adequate proportion of the alkyl halide reactant to keep the AlCl$_3$ complex in solution.

EXAMPLE 7

Adamantane (1.00 g.=0.00734 mole) was reacted with t-butyl chloride (0.847 g.=0.00915 mole) in substantially the same manner as described in U.S. Pat. No. 3,096,372, referred to above. Cyclohexane (3.5 ml.) was used as solvent for the adamantane. The mixture was stirred at room temperature and 0.05 g. of AlCl$_3$ was added. It did not dissolve but formed a yellow complex layer, with a very slight evolution of gas occurring. After 15 minutes stirring another 0.05 g. of AlCl$_3$ was added and the mixture was stirred for a total of 90 minutes. The catalyst complex phase was a brown liquid while the organic phase was yellowish. The latter was washed with water and was analyzed, giving results shown in Table E.

TABLE E

Reaction of adamantane and t-butyl chloride in cyclohexane

|  | Example 7, percent |
| --- | --- |
| Adamantane | 13.6 |
| 1-chloroadamantane | 77.6 |
| 1,3-dichloroadamantane | 8.8 |
|  | 100.0 |

From the data in Table E it can be seen that reaction of adamantane under the conditions of Example 7 gives no bis-type product. The only type of reaction that occurred was halogen-hydrogen interchange between the alkyl chloride and bridgehead hydrogen atoms of the adamantane nucleus.

EXAMPLE 8

This example shows the reaction of n-propyl chloride with DMA at a total molar ratio of 4.1, the alkyl chloride being added in two portions. Specifically, a blend of 1.91 g. (0.0243 mole) of n-propyl chloride, 2.0 g. (0.0122 mole) of DMA and 0.05 g. (0.000375 mole) of $AlCl_3$ was stirred at 26° C. The $AlCl_3$ dissolved giving a yellow solution which evolved HCl, thickened after about 10 minutes and then crystallized. A second portion of n-propyl chloride (2.01 g.=0.0256 mole) was added and the suspension was stirred for 3 hours and appeared to become thicker. The reaction product was mixed with excess methanol and filtered, giving a solid melting at 160–180° C. A sample of this whole crude product was recrystallized twice from hot benzene to yield product melting at 215–222° C. Another sample was recrystallized twice from hot $CCl_4$ giving a white powder, M.P. 211–223° C. This was bis-type product not otherwise specifically identified but most probably was mainly the dichloro compound, 1,3-bis(3 - chloro - 5,7 - dimethyl-1-adamantyl)propane, in view of its high melting point. Upon evaporation of the $CCl_4$ from the combined filtrates from the two recrystallizations, there was obtained another solid product melting at 165–175° C. which appeared to be a mixture of the bis-type hydrocarbon and the monochloro bis-type compound (analogous, respectively, to I and II, supra).

EXAMPLE 9

The reactants in this instance were isopropyl chloride (1.91 g.) and DMA (2.00 g.), and a blend thereof was mixed with $AlCl_3$ (0.05 g.) and reacted at 0° C., whereupon in about 20 minutes it became cloudy and thickened with precipitate. The mixture was then stirred at room temperature for about one hour at which time it had become too thick to stir. After standing for about 2 hours more at room temperature, it was triturated with excess methanol and the mixture was filtered. This gave a colorless powder, M.P. 135–162° C. Recrystallization from $CCl_4$ increased the M.P. to 188–198° C., and a second recrystallization from $CCl_4$ gave M.P. of 200–204° C. This material was bis-type product but the average number of chlorine atoms per molecule therein was not specifically determined. This reaction (alkyl chloride:DMA molar ratio=2.0) gave essentially no polymer product.

EXAMPLE 10

This example involves the reaction of isopropyl chloride and DMA under conditions (molar ratio=4.2) such that both bis-type and polymer products were obtained. The reaction mixture comprised 4.00 g. (0.051 mole) of isopropyl chloride, 2.00 g. (0.0122 mole) of DMA and 0.16 g. of $AlCl_3$. A reflux condenser was provided to return any isopropyl chloride evolved during the reaction to the system. The reaction was started at 0° C. and after 5 minutes was warmed to 26° C. HCl evolved rapidly and within 10 minutes the mixture had set up to a yellow solid. After 20 minutes the mixture was warmed to 40° C. and still evolved HCl while refluxing isopropyl chloride. At 45 minutes reaction time the mixture was heated rapidly to 80° C., 20 ml. of methanol were added, and the mixture was allowed to reflux. About 2.30 g. of colorless product insoluble in methanol resulted. Upon recrystallization of this material twice from hot toluene, a residue representing about half of it and having a melting point of 237–241° C. was obtained. This material could not be eluted from a high temperature VPC column and was the polymer product. The toluene-soluble material was recovered from the filtrates by evaporation of toluene and was a viscous liquid tending to crystallize at room temperature. VPC analysis of the latter product showed that it was largely composed of the same bis-type material as the product of Example 8.

EXAMPLE 11

A blend of 1.00 g. (0.00609 mole) of 1-ethyladamantane and 4.00 g. (0.0509 mole) of n-propyl chloride was mixed at 26° C. with 0.03 g. of $AlCl_3$. The latter dissolved and the resulting yellow solution evolved HCl copiously. The mixture thickened and became nearly solid. After one hour 0.89 g. (0.0113 mole) of additional n-propyl chloride and 0.03 g. of $AlCl_3$ were mixed in, and further evolution of gas and thickening of the mixture occurred. The resulting mixture was dissolved in methylene chloride and then methanol was added to yield a gummy product. The latter was triturated with methanol and the solid material in the mixture was recovered by filtration and drying. This material was largely bis-type compounds but contained a minor proportion of chlorinated ethyladamantane. Observation in a hot-stage microscope showed the following melting behavior:

⅕ melting—<91° C.
⅕ melting—91–144° C.
⅗ melting—144–179° C.

EXAMPLE 12

This illustrates the preparation of polymer material from n-butyl chloride and DMA (molar ratio=4.4) at 26° C. The starting reaction mixture, composed of 5.00 g. (0.054 mole) of n-butyl chloride, 2.00 g. (0.01218 mole) of DMA and 0.05 g., initially gave a vigorous evolution of HCl which soon slowed. During a period of one hour three more 0.05 g. increments of $AlCl_3$ were added, and the mixture was allowed to stand overnight. A viscous solution with no separate catalyst complex phase and no crystalline product was obtained. Mixing of the solution with methanol gave a gummy precipitate which was separated, triturated with more methanol and then dissolved in benzene to give a slightly opaque solution. The latter was filtered through diatomaceous earth and acetone was added to precipitate a gummy layer which, upon trituration with more acetone, became granular. Evaporation of residual acetone gave a light yellow polymer which melted close to 100° C. and became opaque upon cooling. This material, which constituted about ⅓ of the total reaction product, had a molecular weight (osmometric) of 1186 and corresponded approximately to the formula:

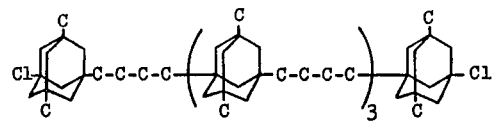

Upon boiling down the benzene-methanol layer, a viscous oily polymer of lower molecular weight constituting ⅔ of the reaction product and which did not crystallize was obtained.

EXAMPLE 13

This illustrates the preparation of cross-linked polymer from adamantane and n-butyl chloride, the latter being added in increments. The initial reaction mixture, composed of 1.1 g. (0.0081 mole) of adamantane, 2.2 g. (0.024 mole) of n-butyl chloride and 0.05 g. of $AlCl_3$, was stirred at 26° C., whereupon it became homogeneous and evolved HCl. After 20 minutes the mixture was fairly viscous and still evolved HCl slowly. At this point 1.77 g. (0.019 mole) of n-butyl chloride were added, following which vigorous evolution of gas re-occurred and the mixture remained homogeneous. Addition of 0.88 g. (0.0095 mole) of n-butyl chloride caused the reaction to stop, leaving a viscous solution. When excess butyl chloride was evaporated from a small sample thereof, a clear film resulted. Additional $AlCl_3$ (0.01 g.) was stirred into the reaction mixture, whereupon frothing took place and the mixture became solid and rubbery. Trituration with methanol and agitation gave a suspension of hard, colorless granules which were separated by filtration and dried. Microscopic examination of the melting behavior of this product showed no change in gross morphology when heated to 350° C., and it was apparent that a cross-linked polymer had been obtained.

EXAMPLE 14

Adamantane and n-propyl chloride likewise were reacted to form a cross-linked polymer. Specifically, 1.0 g. (0.0073 mole) of adamantane, 5.80 g. (0.074 mole) of n-propyl chloride and 0.03 g. of $AlCl_3$ were mixed at room temperature. Vigorous bubbling occurred, and the mixture turned yellow and remained homogeneous following dissolution of the $AlCl_3$. In 30 minutes the mixture had set up as a solid foam. This was triturated with methanol and methylene chloride, giving a suspension of hard granular product which was recovered by filtration and dried. This likewise was cross-linked polymer melting above 350° C.

EXAMPLE 15

This example, included for comparative purposes, was an attempt to use n-hexyl chloride for coupling DMA molecules to make bis-type product. Specifically, a blend of 2.00 g. (0.0122 mole) of DMA and 2.94 g. (0.0244 mole) of n-hexyl chloride was stirred at room temperature and 0.1 g. of powdered $AlCl_3$ was added thereto. A dark brown catalyst complex phase immediately separated and no bis compounds or higher molecular weight products formed. This illustrates the fact that a $C_3$ or $C_4$ alkyl halide is required for practice of this invention and that higher alkyl halides are not operative for the purpose.

When $C_3$ or $C_4$ alkyl bromides are used in place of the corresponding chlorides and $AlBr_3$ is used in place of $AlCl_3$, substantially equivalent results are obtained. Likewise, when other alkyladamantane hydrocarbons as herein specified are substituted for the starting hydrocarbons in the foregoing examples, linking of their nuclei to produce bis-type or polymer products or both occurs in analogous fashion.

The monohalo or the hydrocarbon bis-type products of the present process can be recycled to the process for further conversion to give increased yields of the dihalo bis-type derivatives.

The dihalo bis-type compounds are useful as intermediates for making monomers from which various types of novel polymers can be made. These dihalo compounds can be reacted by the Koch reaction (Koch et al., Liebig's Ann. Chem., 618, 251–266 (1958)) with formic acid or carbon monoxide in the presence of strong sulfuric acid to produce diacids by substitution of a carboxyl group in place of each halogen atom. For example 1,4-bis(3-chloro-5,7-dimethyl 1-adamantyl)butane can in this manner be converted to 1,4-bis(3-carboxy-5,7-dimethyl-1-adamantyl)butane. Such diacids constitute new monomers from which novel polymers such as polyesters or polyamides can be made. Likewise the dihalo bis-type products can be converted to diols by alkaline hydrolysis or to diamides by the Ritter reaction, thus yielding other monomers useful for making polymers containing adamantane nuclei. Polymers prepared from the various types of monomers that can be made in this manner have high thermal stability due to the inherent stability of the adamantane nucleus. This characteristic renders the polymers particularly useful in coating compositions where stability at elevated temperatures is desired.

This bis-type compounds provided by the present invention also have numerous direct uses other than as intermediates in polymer manufacture. The bis-type hydrocarbons are useful, for example, as stiffening agents in candles, while these bis-type hydrocarbons as well as the monohalo and dihalo analogues have utility as antiblocking agents in wax compositions for coating paper. All of these bis-type products are particularly valuable as components of wax compositions useful for investment casting, in view of their stabilities, high melting points, low melt viscosities and absence of any ash content after ignition. Also these products, when separated from the reaction mixture as individual crystalline compounds of high purity, are useful as actuating media in thermostats that operate through expansion and contraction as the medium melts and solidifies.

Of the bs-type compounds that can be prepared in accordance with the invention, some will be obtainable in non-crystalline form depending upon the size and arrangement of alkyl substituents on the adamantane nuclei and also upon whether or not they are recovered as mixtures or as individual compounds. Any of these products which are non-crystalline are useful as components of caulking compositions, potting compounds and adhesives.

Polymers prepared directly from the adamantane hydrocarbons in accordance with the invention, including both the noncross-linked and the cross-linked types, can be employed as the absorption medium in high temperature gas chromatography columns in view of their thermal stabilities and inertness. The cross-linked polymers also are useful as the separating medium in gel permeation chromatograph. The non-cross-linked polymers have utility as resin components in varnish and coating compositions for providing finished surfaces having good stability and hardness characteristics. The cross-linked polymers also are useful as inert fillers for investment casting wax compositions in view of their inertness, stability and low volume expansion characteristics.

U.S. Pat. No. 3,342,880 discloses the preparation of polymers from 3,3'-derivatives of -1,1-biadamantane, wherein the adamantane nuclei are directly joined to each other. It also discloses the preparation of methylene-bis-adamantylamide the polymers of which would have a single methylene link between adamantane nuclei. Such polymers are disclosed as having high thermal stabilities and as being useful where stability at high temperature is desired. Polymers prepared directly by the present process, as well as those made by utilizing the dihalo bis-type products as intermediates to monomers which are thereafter polymerized, have similar stability characteristics but offer distinct advantages with respect to brittleness. The prior art polymers containing adamantane nuclei linked directly to each other or linked through a single methylene linkage are quite brittle due to the rigidity of the polymer chains. The present polymers, on the other hand, have either trimethylene or tetramethylene linkages between the nuclei and the chains are less rigid. As a consequence, these polymers—particularly those with the tetramethylene linkages—are better able to absorb mechanical energy and consequently have considerably less brittleness.

I claim:

1. Method of linking adamantane nuclei through a $C_3$ or $C_4$ polymethylene linkage which comprises:
    (a) forming a solution of (1) a $C_{10}$–$C_{20}$ adamantane hydrocarbon which is adamantane or an alkyladamantane having at least one unsubstituted bridgehead carbon atom and no alkyl tertiary carbon atom and (2) a $C_3$–$C_4$ alkyl halide, said halide being selected from the group consisting of chloride and bromide, in molar ratio relative to said hydrocarbon in excess of 1:1 but less than 2:1 when the alkyl halide is tertiary butyl halide, said alkyl halide being a primary or secondary alkyl halide when said hydrocarbon is adamantane;
    (b) maintaining said solution at a temperature in the range of —20° C. to 50° C. while admixing therewith and dissolving therein $AlCl_3$ or $AlBr_3$ until at least a major portion of said adamantane hydrocarbon has reacted, said temperature being above 10° C. when said alkyl halide is tertiary butyl halide; and
    (c) recovering from the reaction mixture a product having adamantane nuclei linked between bridgehead positions through a $C_3$–$C_4$ polymethylene linkage.

2. Method according to claim 1 wherein said alkyl halide is a primary or secondary alkyl halide.

3. Method according to claim 2 wherein the molar proportion of said alkyl halide to said adamantane hydrocarbon is in the range of 1:1 to 3:1 and wherein said product has two adamantane nuclei and conforms to the formula

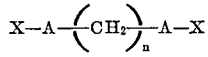

wherein A represents the combination of an adamantane nucleus with 0–3 alkyl substituents, X is a bridgehead substituent of the group consisting of chlorine, bromine, alkyl and hydrogen, and $n$ is 3 or 4.

4. Method according to claim 3 wherein A has 1–2 bridgehead alkyl substituents selected from the group consisting of methyl and ethyl and X is a halogen selected from the group consisting of chlorine or bromine.

5. Method according to claim 3 wherein said temperature is in the range of 0 to 30° C.

6. Method according to claim 4 wherein said temperature is in the range of 0 to 30° C.

7. Method according to claim 4 wherein said alkyl halide is a $C_3$ halide, said adamantane hydrocarbon is 1,3-dimethyladamantane or 1-ethyl-3-methyladamantane, and said product is 1,3-bis(3-halogen-5,7-dimethyl-1-adamantyl)propane or 1,3-bis(3-halogen-5-ethyl-7-methyl-1-adamantyl)propane, respectively.

8. Method according to claim 4 wherein said alkyl halide is a $C_4$ halide, said adamantane hydrocarbon is 1,3-dimethyladamantane or 1-ethyl-3-methyladamantane, and said product is 1,4-bis(3-halogen-5,7-dimethyl-1-adamantyl)butane or 1,4-bis(3-halogen-5-ethyl-7-methyl-1-adamantyl)butane, respectively.

9. Method according to claim 3 wherein said alkyl halide is an alkyl chloride and the aluminum halide is $AlCl_3$.

10. Method according to claim 9 wherein said temperature is in the range of 0 to 30° C.

11. Method according to claim 1 wherein said alkyl halide is a primary or secondary alkyl halide, said adamantane hydrocarbon has at least two unsubstituted bridgehead positions, the molar proportion of said alkyl halide to said adamantane hydrocarbon exceeds 3:1, and said product is a polymer having more than two adamantane nuclei linked in the manner specified.

12. Method according to claim 11 wherein said temperature is above 15° C.

13. Method according to claim 11 wherein said adamantane hydrocarbon is 1,3-dimethyladamantane or 1-ethyl-3-methyladamantane.

14. Method according to claim 11 wherein said alkyl halide is an alkyl chloride and the aluminum halide is $AlCl_3$.

15. Method according to claim 14 wherein said adamantane hydrocarbon is 1,3-dimethyladamantane or 1-ethyl-3-methyladamantane and said temperature is above 15° C.

16. A polymer prepared by the method of claim 11.

17. A polymer prepared by the method of claim 13.

18. A compound conforming to the formula

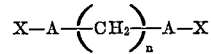

wherein A represents the combination of an adamantane nucleus with 0–3 alkyl substituents, X is a bridgehead substituent selected from the group consisting of chlorine, bromine, hydrogen and alkyl having no tertiary carbon atom, and $n$ is 3 or 4 and wherein the two A groups are linked between bridgehead positions through the polymethylene linkage and the total number of carbon atoms in each —A—X moiety is in the range of 10–20.

19. A compound according to claim 18 wherein X is a halogen selected from the group consisting of chlorine or bromine.

20. A compound according to claim 19 wherein A has 1–2 bridgehead alkyl substituents.

21. A compound according to claim 20 selected from 1,3-bis(3-halogen-5,7-dimethyl-1-adamantyl)propane; 1,3-bis(3-halo-5-ethyl-7-methyl-1-adamantyl)propane; 1,4-bis(3-halogen-5,7-dimethyl-1-adamantyl)butane; and 1,4-bis(3-halogen-5-ethyl-7-methyl-1-adamantyl)butane.

22. A compound according to claim 18 wherein one X is chlorine or bromine and the other X is hydrogen.

23. A compound according to claim 22 wherein A has 1–2 bridgehead alkyl substituents.

References Cited

UNITED STATES PATENTS

| | | | |
|---|---|---|---|
| 3,096,372 | 7/1963 | Gerzon | 260—553 |
| 3,342,880 | 9/1967 | Reinhardt | 260—648 |
| 3,382,288 | 5/1968 | Schneider | 260—666ADAM |

OTHER REFERENCES

Stepanov et al.: J. Gen. Chem. U.S.S.R., 34 (1964), pp. 580–584.

HOWARD T. MARS, Primary Examiner

U.S. Cl. X.R.

252—426; 260—2, 28, 514, 551, 617, 666